Patented June 21, 1927.

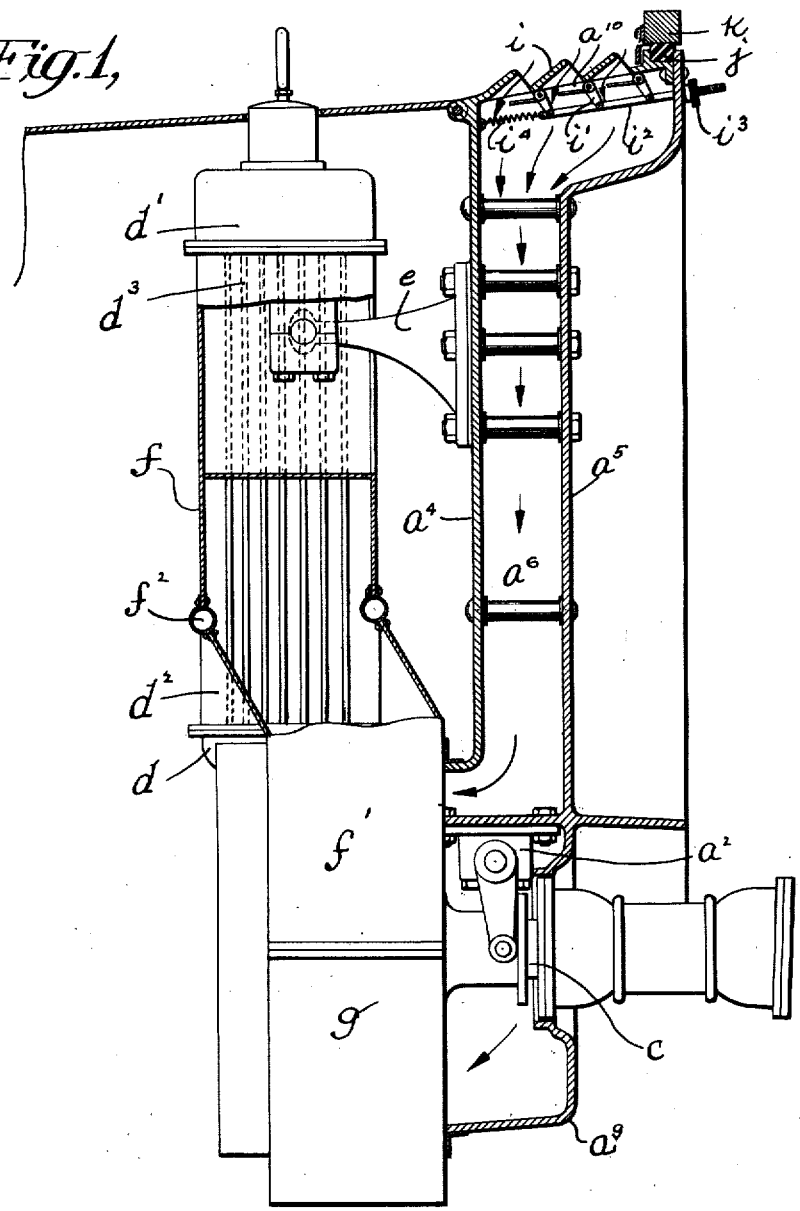

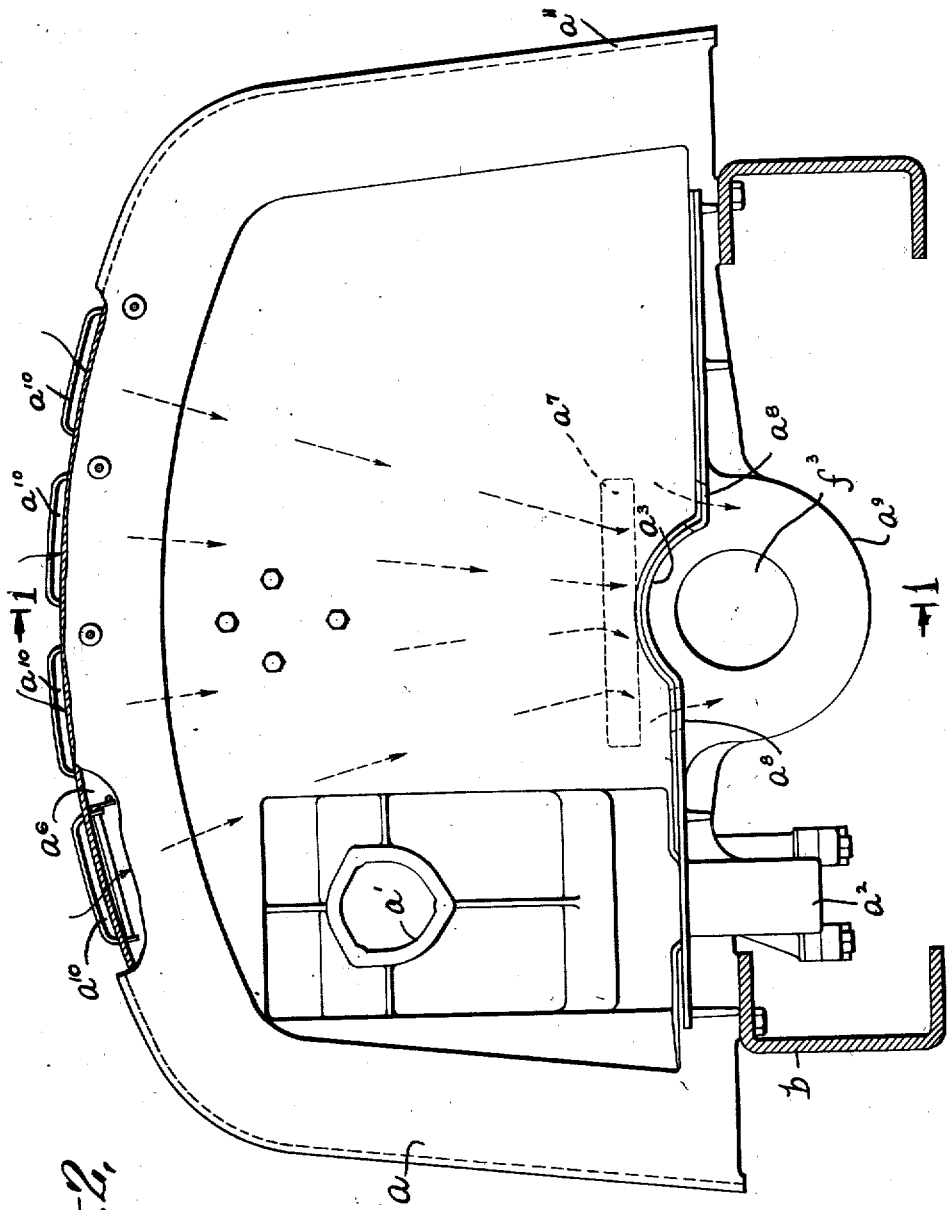

1,633,093

UNITED STATES PATENT OFFICE.

ERVING R. GURNEY, OF BEECHHURST, NEW YORK, ASSIGNOR TO INTERNATIONAL MOTOR COMPANY, OF NEW YORK, N. Y., A CORPORATION OF DELAWARE.

VEHICLE DASH.

Application filed December 19, 1924. Serial No. 756,870.

In the co-pending application Serial No. 747,841 filed November 4, 1924, there is disclosed a metallic vehicle dash adapted to be directly supported on the vehicle frame and to serve as a support for other elements of the vehicle such as the radiator support disclosed in co-pending application Serial No. 736,007, filed September 5, 1924. In the construction according to the latter application banks of radiator tubes are supported from the vehicle frame upon either side of a duct which direct air from a fan disposed in operative position in proximity to the fly-wheel of the motor upwardly and outwardly through the spaced banks of radiator tubes. The inlet for the air was formed in the fan housing according to the previous proposal which, from the nature of the construction, was close to the roadway. It has been found in practice that such disposition of the air inlet permitted the suction by the fan of great quantities of dust, leaves and other foreign matter into the air duct from whence it had to be expelled through the banks of radiator tubes with constant clogging of the interstices with foreign matter. Furthermore the dash being of metal and preferably cast aluminium became quickly heated up, due to its proximity to the motor, to the manifest discomfort of the driver and other occupants of the vehicle. The present invention has for its object to provide inlet means for the cooling air which shall be disposed where the air is relatively free from dust and foreign matter. To this end a passage is formed in the wall of the dash which is open at its upper end at approximately the uppermost portion of the dash and communicates at its other end with the fan housing which is otherwise provided with no air inlet. It is also an object of the invention to insulate to a degree the driver's cab or interior of the vehicle from the motor in the interest of comfort. To this end the front wall of the dash may be formed as a double wall having an appreciable air space therebetween which may serve as the air intake passage to the fan housing and provide a live air space between the motor and the interior of the vehicle.

A further object of the invention contemplates the control of the volume of air entering the fan housing to the end that the temperature of the radiator may be controlled most efficiently. Accordingly the upper end of the air passage in the dash is provided with a plurality of louvres actuated from the interior of the dash to control the volume of air entering the passage.

The invention will now be described more fully with reference to the accompanying drawings illustrating a preferred embodiment thereof, in which:

Figure 1 is a view in side elevation showing the dash according to the present invention and the manner in which the cooling means for the radiator is associated therewith, parts being broken away in the interest of clearness.

Figure 2 is a view of the dash looking from the rear.

Referring first to Figure 2, the dash which is indicated as a whole at $a$ is adapted to be supported directly upon the side frame members $b$ of the chassis as in co-pending application No. 747,841. Provision is made in the dash for the passage of the steering post as at $a'$ and the support of the brake clutch pedals and the like as indicated in general at $a^2$. Centrally of the dash the floor thereof is offset as at $a^3$ to provide clearance for the propeller shaft $c$ of the vehicle. While various types of radiators may be used on motor vehicles carrying a dash according to the present invention that disclosed in the drawings is of the type shown and described in co-pending applications Ser. No. 736,007 filed September 5, 1924 wherein the lower tanks $d$ are supported by yielding non-metallic connections directly from the chassis side frame members. An upper tank $d'$ is supported through a similar connection directly from the dash as at $e$. The upper and lower tanks are in communication through banks of radiator tubes disposed upon either side of the vehicle, fragmentary portions of which are indicated at $d^2$, $d^3$, respectively. Between the banks of radiator tubes there is disposed an upper duct portion $f$ depending from the upper tank $d'$ and a lower duct portion $f'$ secured to the fan housing $g$. The upper and lower duct sections may be connected by yielding connections $f^2$. Since, in the old construction, the fan inlet was disposed so close to the roadway considerable dust and foreign matter was sucked up off the road and forced into the radiators. The present invention contemplates the incorporation of an inlet duct communicating with the atmosphere at a point where the air is comparatively free from foreign matter and conducting such relatively clear air to the inlet or fan housing. In the illustrated embodiment such an inlet duct is shown as incorporated in the front wall of the dash although it will be apparent that an independent duct might be provided for this passage. Rearwardly of the front wall $a^4$ of the dash there is formed a second wall $a^5$ to form an air space or passage $a^6$ communicating at its lowermost portion directly into the upper part of the fan housing through a slot $a^7$ and through openings $a^n$ upon either side of the propeller shaft into an annular chamber $a^9$ surrounding the propeller shaft and communicating with the air inlet $f^3$ of the fan housing.

The passage $a^6$ is open in the uppermost part thereof to the atmosphere through a series of air entrances $a^{10}$ disposed about the top of the dash. Each of the air entrances may be adapted to be controlled by a plurality of louvres $i$ capable of adjustment from the dash. In the preferred embodiment some or all of the shutters may be carried upon what constitutes one arm of levers $i'$ pivotally mounted in the top of the dash and connected to a rod $i^2$ which may be drawn rearwardly to cause the opening of the shutters by turning a nut $i^3$ upon the threaded end thereof. A spring $i^4$ may be provided having a tendency to constantly draw the rod forwardly and close the louvres.

At the rear edge the dash may be formed with a groove $a^{11}$ for the reception of a cushion of yielding non-metallic material $j$ upon which the body $k$ rests as in the prior application.

By the provision of a double walled dash a live air space is afforded between the interior of the body and the cushion which serves to insulate the interior from the engine space and prevent the passage of heat therebetween to the added comfort of the operator and passengers in the vehicle. By opening the passage to the atmosphere in the uppermost part of the dash and substantially closing the lowermost part against the admission of air relatively clear air is taken in to the fan.

Various modifications may be made in the shape and location of the air intake passage communicating with the fan housing as well as in the manner of controlling the admission of air thereto and no limitation is intended by the foregoing description or illustrations except as indicated in the appended claims.

What I claim is:

1. In a motor vehicle, the combination with the radiator and fan having a housing, a unitary dash, means mounting the main brace of the radiator thereon, a passage in the dash open to the atmosphere at its upper extremity and leading to the fan housing, and means to control the flow of air in the passage.

2. As an article of manufacture, a unitary vehicle dash formed with a double wall open at the top to the atmosphere and open at the bottom, louvres formed in the opening at the top to control the influx of air, means mounted on the dash to control said louvres, and means to connect the bottom with cooling means.

This specification signed this 17th day of December A. D. 1924.

ERVING R. GURNEY.

cating with the atmosphere at a point where the air is comparatively free from foreign matter and conducting such relatively clear air to the inlet or fan housing. In the illustrated embodiment such an inlet duct is shown as incorporated in the front wall of the dash although it will be apparent that an independent duct might be provided for this passage. Rearwardly of the front wall $a^4$ of the dash there is formed a second wall $a^5$ to form an air space or passage $a^6$ communicating at its lowermost portion directly into the upper part of the fan housing through a slot $a^7$ and through openings $a^n$ upon either side of the propeller shaft into an annular chamber $a^9$ surrounding the propeller shaft and communicating with the air inlet $f^3$ of the fan housing.

The passage $a^6$ is open in the uppermost part thereof to the atmosphere through a series of air entrances $a^{10}$ disposed about the top of the dash. Each of the air entrances may be adapted to be controlled by a plurality of louvres $i$ capable of adjustment from the dash. In the preferred embodiment some or all of the shutters may be carried upon what constitutes one arm of levers $i'$ pivotally mounted in the top of the dash and connected to a rod $i^2$ which may be drawn rearwardly to cause the opening of the shutters by turning a nut $i^3$ upon the threaded end thereof. A spring $i^4$ may be provided having a tendency to constantly draw the rod forwardly and close the louvres.

At the rear edge the dash may be formed with a groove $a^{11}$ for the reception of a cushion of yielding non-metallic material $j$ upon which the body $k$ rests as in the prior application.

By the provision of a double walled dash a live air space is afforded between the interior of the body and the cushion which serves to insulate the interior from the engine space and prevent the passage of heat therebetween to the added comfort of the operator and passengers in the vehicle. By opening the passage to the atmosphere in the uppermost part of the dash and substantially closing the lowermost part against the admission of air relatively clear air is taken in to the fan.

Various modifications may be made in the shape and location of the air intake passage communicating with the fan housing as well as in the manner of controlling the admission of air thereto and no limitation is intended by the foregoing description or illustrations except as indicated in the appended claims.

What I claim is:

1. In a motor vehicle, the combination with the radiator and fan having a housing, a unitary dash, means mounting the main brace of the radiator thereon, a passage in the dash open to the atmosphere at its upper extremity and leading to the fan housing, and means to control the flow of air in the passage.

2. As an article of manufacture, a unitary vehicle dash formed with a double wall open at the top to the atmosphere and open at the bottom, louvres formed in the opening at the top to control the influx of air, means mounted on the dash to control said louvres, and means to connect the bottom with cooling means.

This specification signed this 17th day of December A. D. 1924.

ERVING R. GURNEY.

Certificate of Correction.

Patent No. 1,633,093.  Granted June 21, 1927, to

ERVING R. GURNEY.

It is hereby certified that error appears in the printed specification of the above-numbered patent requiring correction as follows: Page 2, line 65, claim 1, for the word "brace" read *body*; and that the said Letters Patent should be read with this correction therein that the same may conform to the record of the case in the Patent Office.

Signed and sealed this 18th day of October, A. D. 1927.

[SEAL.]

M. J. MOORE,
*Acting Commissioner of Patents.*

Certificate of Correction.

Patent No. 1,633,093. Granted June 21, 1927, to

ERVING R. GURNEY.

It is hereby certified that error appears in the printed specification of the above-numbered patent requiring correction as follows: Page 2, line 65, claim 1, for the word " brace " read *body;* and that the said Letters Patent should be read with this correction therein that the same may conform to the record of the case in the Patent Office.

Signed and sealed this 18th day of October, A. D. 1927.

[SEAL.]

M. J. MOORE,
*Acting Commissioner of Patents.*